(12) United States Patent
Rus et al.

(10) Patent No.: US 10,857,669 B2
(45) Date of Patent: Dec. 8, 2020

(54) MODULAR ANGULAR-MOMENTUM DRIVEN MAGNETICALLY CONNECTED ROBOTS

(71) Applicant: Massachusetts Institute of Technology, Cambridge, MA (US)

(72) Inventors: Daniela Rus, Weston, MA (US); John W. Romanishin, Medford, MA (US); Kyle W. Gilpin, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 689 days.

(21) Appl. No.: 14/067,132

(22) Filed: Oct. 30, 2013

(65) Prior Publication Data
US 2014/0298945 A1 Oct. 9, 2014

Related U.S. Application Data

(60) Provisional application No. 61/808,783, filed on Apr. 5, 2013.

(51) Int. Cl.
*B25J 9/08* (2006.01)
*A63H 29/20* (2006.01)
(Continued)

(52) U.S. Cl.
CPC ............... *B25J 9/08* (2013.01); *A63H 29/20* (2013.01); *A63H 33/046* (2013.01); *A63H 33/26* (2013.01)

(58) Field of Classification Search
CPC .... A63H 33/26; A63H 33/046; A63H 33/042; A63H 29/20; A63H 11/06; B25J 9/08; B25J 9/126; A63F 2003/00391
(Continued)

(56) References Cited

U.S. PATENT DOCUMENTS 2,939,243 A 6/1960 Duggar
3,968,593 A * 7/1976 Lin ................... A63H 29/20
446/462

(Continued)

FOREIGN PATENT DOCUMENTS

AT EP 2055363 A1 * 5/2009 ........... A63H 33/008
EP 0993912 A2 4/2000
(Continued)

OTHER PUBLICATIONS

Fitch et al., "Reconfiguration Planning Among Obstacles for Heterogeneous Self-Reconfiguring Robots", Apr. 2005, Proceedings of the 2005 IEEE International Conference on Robotics and Automation, pp. 117-124. (Year: 2005).*
(Continued)

*Primary Examiner* — Bobby Rushing, Jr.
(74) *Attorney, Agent, or Firm* — Gesmer Updegrove LLP

(57) ABSTRACT

A modular robotic system that includes a plurality of self-configuring robots. Each self-configuring robot includes a frame structure having a plurality of cylindrical bonding magnets positioned along the edges of the frame structure. The frame structure includes magnetic, non-gendered, hinges on any of the edges of the frame. The hinges provide enough force to maintain a pivot axis through various motions. The cylindrical bonding magnets are free to rotate allowing for multiple self-configurations with other like self-configuring robots. A movement generator is positioned within the frame structure that pivots to generate multi-axis movement allowing both robust self-reconfiguration with the other self-configuring robots and independent locomotion.

7 Claims, 12 Drawing Sheets

(51) Int. Cl.
*A63H 33/26* (2006.01)
*A63H 33/04* (2006.01)

(58) Field of Classification Search
USPC .......... 446/90, 92, 102, 103, 137, 138, 233; 74/5 R, 5.7, 5.95, 84 R, 86, 64, 83, 89.1
See application file for complete search history.

(56) References Cited

U.S. PATENT DOCUMENTS

| | | | | |
|---|---|---|---|---|
| 3,998,004 | A * | 12/1976 | Ehrlich | A63H 33/046 428/900 |
| 5,347,253 | A * | 9/1994 | Ogikubo | A63F 9/12 273/239 |
| 5,361,186 | A | 11/1994 | Taine et al. | |
| 6,227,933 | B1 * | 5/2001 | Michaud | A63H 33/005 446/458 |
| 7,154,363 | B2 * | 12/2006 | Hunts | H01F 7/0242 24/303 |
| 8,458,863 | B2 * | 6/2013 | Hunts | H01F 7/0242 24/303 |
| 9,022,829 | B2 * | 5/2015 | Rosen | A63H 33/046 446/108 |
| 9,789,413 | B2 * | 10/2017 | Erhart | A63H 15/06 |
| 2006/0101547 | A1 | 5/2006 | Desmond | |
| 2012/0122059 | A1 * | 5/2012 | Schweikardt | A63H 33/04 434/118 |
| 2012/0291571 | A1 * | 11/2012 | Peng | G02B 26/001 74/5.37 |
| 2012/0298430 | A1 * | 11/2012 | Schroll | B62D 37/06 180/8.1 |
| 2012/0309259 | A1 | 12/2012 | Mak | |
| 2013/0109267 | A1 * | 5/2013 | Schweikardt | A63H 33/04 446/85 |
| 2013/0285399 | A1 | 10/2013 | Sarh et al. | |
| 2017/0239588 | A1 * | 8/2017 | Roth | A63H 33/062 |

FOREIGN PATENT DOCUMENTS

| | | | | |
|---|---|---|---|---|
| JP | 2011083541 | A * | 4/2011 | |
| WO | WO 2011011084 | A1 * | 1/2011 | A63H 33/04 |
| WO | 2011089109 | A1 | 7/2011 | |

OTHER PUBLICATIONS

International Preliminary Report on Patentability issued in connection with the corresponding PCT Application No. PCT/US2014/030248, dated Oct. 15, 2015.

Gilpin et al., "Robot Pebbles: One Centimeter Modules for Programmable Matter Through Self-Disassembly" 2010 IEEE International Conference on Robotics and Automation, Anchorage Convention District, May 3-8, 2010, pp. 2485-2492.

Romanishin et al., "M-Blocks: Momentum-driven, Magnetic Modular Robots" IEEE/RSJ International Conference on Intelligent Robots and Systems (IROS), Nov. 3, 2013, pp. 4288-4295.

Kurokawa et al., "Distributed Self-Reconfiguration of M-Tran III Modular Robotic System" The International Journal of Robotics Research, Mar./Apr. 2008, vol. 27, No. 3-4, pp. 373-386.

The International Search Report and Written Opinion issued in connection with the corresponding PCT Application No. PCT/US14/30248, dated Jul. 28, 2014.

White and Yim, "Scalable Modular Self-Reconfigurable Robots Using External Actuation," Proceedings of the IEEE/RSJ International Conference on Intelligent Robots and Systems, San Diego, CA, Oct. 29-Nov. 2, 2007, pp. 2773-2778.

Gajamohan et al., "The Cubli: A Cube that can Jump Up and Balance," 2012 IEEE/RJS International Conference on Intelligent Robots and Systems, Oct. 7-12, 2012, Portugal, pp. 3722-3727.

Ostergaard et al., "Design of the ATRON lattice-based self-reconfigurable robot", Auton Robot, vol. 21, 2006, pp. 165-183.

Sproewitz et al., "Roombots-Towards Decentralized Reconfiguration with Self-Reconfiguring Modular Robotic Metamodules," The 2010 IEEE/RSJ International Conference on Intelligent Robots and Systems, Oct. 18-22, 2010, Taiwan, pp. 1126-1132.

Gilpin and Rus, "Modular Robot Systems-From Self-Assembly to Self-Disassembly," IEEE Robotics and Automation Magazine, Sep. 2010, pp. 38-55.

Fitch et al., "Reconfiguration Planning Among Obstacles for Heterogeneous Self-Reconfiguring Robots," Proceedings of the 2005 IEEE International Conference on Robotics and Automation, Spain, Apr. 2005, pp. 117-124.

Yim et al., "Modular Self-Reconfigurable Robot Systems-Challenges and Opportunities for the Future," IEEE Robotics and Automation Magazine, Mar. 2007, pp. 43-52.

* cited by examiner

| Illustration | Traverse | Horizontal Traverse | Vertical Traverse † | Horizontal Convex | Vertical Convex †* | Horizontal Concave* | Vertical Concave* | Corner Climb | Jump* |
|---|---|---|---|---|---|---|---|---|---|
| energy(J) | 3.9 | 3.3 | 7.9 | 2.8 | 2.9 | 14 | 14.5 | 7.4 | 14 |
| kRPM | 11-13 | 10-12 | 16-18 | 8.5-12 | 13-15 | 19-21 | 16-17 | 17-18 | 19-21 |
| Attempted | 21 | 20 | 20 | 20 | 20 | 20 | 20 | 15 | 55 |
| Success | 91% | 75% | 60% | 80% | 70% | 65% | 70% | 93% | 51% |

FIG. 8

MODULAR ANGULAR-MOMENTUM DRIVEN MAGNETICALLY CONNECTED ROBOTS

PRIORITY INFORMATION

This application claims priority from provisional application Ser. No. 61/808,783 filed Apr. 5, 2013, which is incorporated herein by reference in its entirety.

SPONSORSHIP INFORMATION

This invention was made with government support under Grant No. IIS1117178 awarded by the National Science Foundation. The government has certain rights in the invention.

BACKGROUND OF THE INVENTION

The invention is related to the field of modular robots, and in particular to modular angular-momentum driven magnetically connected robots.

The prior art includes self-reconfiguring lattice-based modular robots that can be broadly categorized by two attributes: the mode of locomotion and the connection mechanism. Perhaps the most elegant model for locomotion is termed the sliding cube model. In this model, cubes translate (i.e. slide) from one lattice position to another. Despite its theoretical simplicity, no hardware implements this approach in the general 3D case. There are two systems, which implement a 2D version of the sliding cube model in the vertical plane and two systems that operate horizontally. Not only are all of these systems mechanically complex, it is not clear how any of these systems could be extended to 3D.

SUMMARY OF THE INVENTION

According to one aspect of the invention, there is provided a self-configuring robot. The modular robot includes a frame structure that includes a plurality of cylindrical bonding magnets positioned along the edges of the frame structure, the frame structure includes magnetic, non-gendered, hinges on any of the edges of the frame, the hinges provide enough force to maintain a pivot axis through various motions, the cylindrical bonding magnets are free to rotate. A movement generator is positioned within the frame structure that applies a torque about the pivot axis to generate multi-axis movement allowing independent locomotion.

According to another aspect of the invention, there is provided there is provided a self-configuring robot. The self-configuring robot includes a frame structure having a plurality of cylindrical bonding magnets positioned along the edges of the frame structure. The frame structure includes magnetic, non-gendered, hinges on any of the edges of the frame. The hinges provide enough force to maintain a pivot axis through various motions. The cylindrical bonding magnets are free to rotate allowing for multiple self-configurations with another modular structure having magnetic properties. An actuator is positioned within the frame structure that includes a belt and a flywheel structure where the actuator is used to tighten the belt that rapidly decelerates the flywheel to create an impulse of torque generating multi-axis movement allowing both robust self-reconfiguration with the other modular structure and independent locomotion.

According to another aspect of the invention, there is provided a modular robotic system. The modular robotic system includes a plurality of self-configuring robots. Each self-configuring robot includes a frame structure having a plurality of cylindrical bonding magnets positioned along the edges of the frame structure. The frame structure includes magnetic, non-gendered, hinges on any of the edges of the frame. The hinges provide enough force to maintain a pivot axis through various motions. The cylindrical bonding magnets are free to rotate allowing for multiple self-configurations with other like self-configuring robots. A movement generator is positioned within the frame structure that pivots to generate multi-axis movement allowing both robust self-reconfiguration with the other self-configuring robots and independent locomotion.

BRIEF DESCRIPTION OF THE DRAWINGS

FIG. 8 is a table illustrating experimental results for controlled tests of various motion primitives;

DETAILED DESCRIPTION OF THE INVENTION

Figure 1A:
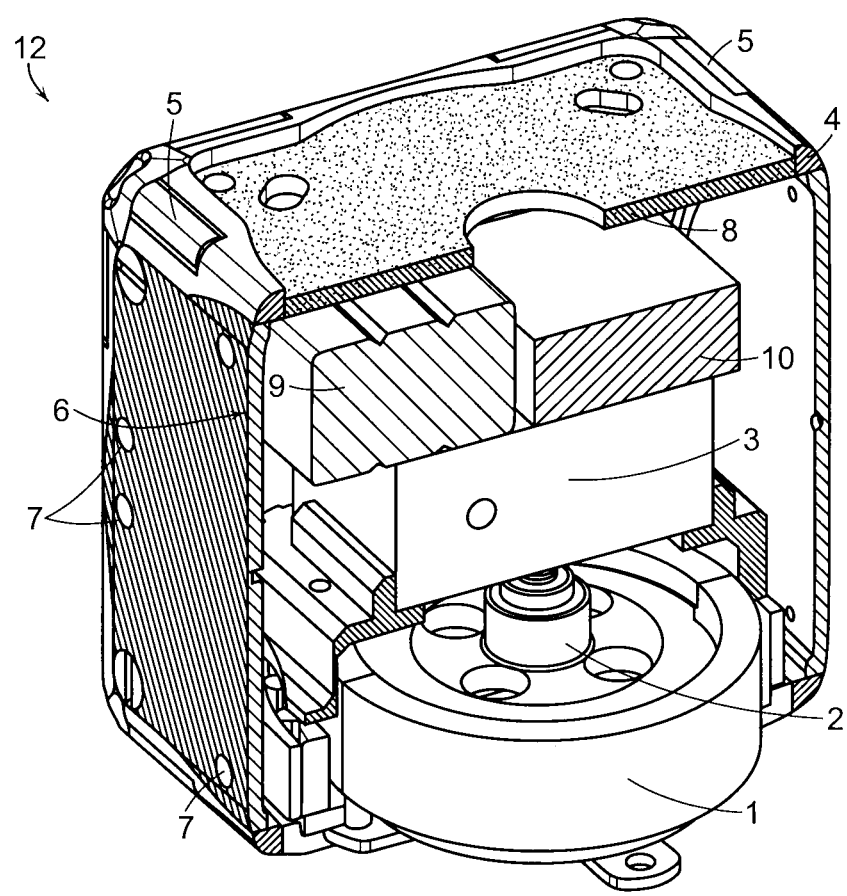
FIG. 1A-1C are schematic diagrams illustrating the various embodiments of the inventive M-Block system used in accordance with the invention.

The inventions involves a novel self-assembling, self-reconfiguring cubic robot that uses pivoting actuation to change its intended geometry. Each individual module can pivot to move linearly on a substrate of stationary modules. The modules can use the same operation to perform convex and concave transitions to change planes. Each module can also move independently to traverse planar unstructured environments. The modules achieve these movements by quickly transferring angular moment accumulated in a flywheel to the body of the cube. The system provides a simplified realization of the modular actions required by the sliding cube model using pivoting.

The invention is most closely related to existing systems whose modules pivot about the edges they share with their neighbors. These existing pivoting systems are confined to the horizontal plane and use complex connection mechanisms and/or external actuation mechanisms to achieve reconfiguration. These prior works make no attempt to define a generalized, three-dimensional model for reconfiguration through pivoting. The invention presents a physical pivoting cube model that can be applied to both solitary modules and groups acting in synchrony by capturing physical quantities including mass, inertia, and bonding forces.

The other defining characteristic of any modular robotic system is its connectors. Many modular systems use mechanical latches to connect neighboring modules. Mechanical latches typically suffer from mechanical complexity and an inability to handle misalignment. Other systems such as the Catoms, Molecule, and E-MCube use electromagnets for inter-module connections. Electromagnets consume more power and are not as strong as mechanical latches. Electro-permanent magnets are an attractive alternative because they only consume power when changing state, but they still require high instantaneous currents to actuate and are not readily available. One unique system uses fluid forces to join neighboring modules, but must operate while submerged in viscous fluid. Another, the Catoms uses electrostatic forces for bonding. The unifying feature of all of these connection mechanisms is that their holding force can be controlled: on, off, or somewhere in-between. This adds complexity and decreases robustness.

In contrast to all of the systems of the prior art, the invention uses a simple mode of location (pivoting), a simple inertial actuator (a flywheel and brake), and a simple bonding mechanism (permanent magnets). Actuation through inertial control has been used extensively in space and underwater robotics as well as several earth-bound applications. There are certain systems in the prior art that uses the inertia of the modules to induce pivoting, but the necessary forces are applied externally; the system is only two-dimensional; and the modules are constrained to 180 degree rotations. The simplicity of the M-Blocks, with their self-contained inertial actuators, allows the invention to achieve both robust self-reconfiguration and independent locomotion in 3D environments.

As shown in FIG. 1, an M-Block 12 is constructed from a 50 mm cubic frame 4 milled from a single piece of 7075 aluminum and the module has a moment of inertial of $63 \times 10-6$ kg m2. However, other firm materials, such as plastic or the like can be used as well. This frame 4 holds twenty-four cylindrical bonding magnets 5 along its twelve edges. Bolt-on panels 6 are attached to the six faces. These panels 6 contain various electrical and mechanical elements such as the inertial actuator 3 and the control PCB 8. Additionally, each of these panels 6 is inset with eight outward-facing magnets 7 that assist in alignment between neighbors.

Also, FIG. 1A shows an exemplary embodiment of the M-Block system having an inertial motor controller (10) and batteries (9). The inertial actuator 3 is composed of a brushless DC motor (2) which spins a flywheel (1). Other motors can also be used as well. An actuator (3) is used to tighten a belt which rapidly decelerates the flywheel (1) to create an impulse of torque. The components of the M-Block can move on a structure formed by the passive modules (which still have all necessary magnets) or completely independently over open ground.

Cost and robustness of modular robots become limiting factors when producing modular systems with many modules. The M-Blocks attempt to address these issues due to their mechanical simplicity and limited number of moving parts.

Figure 1B:
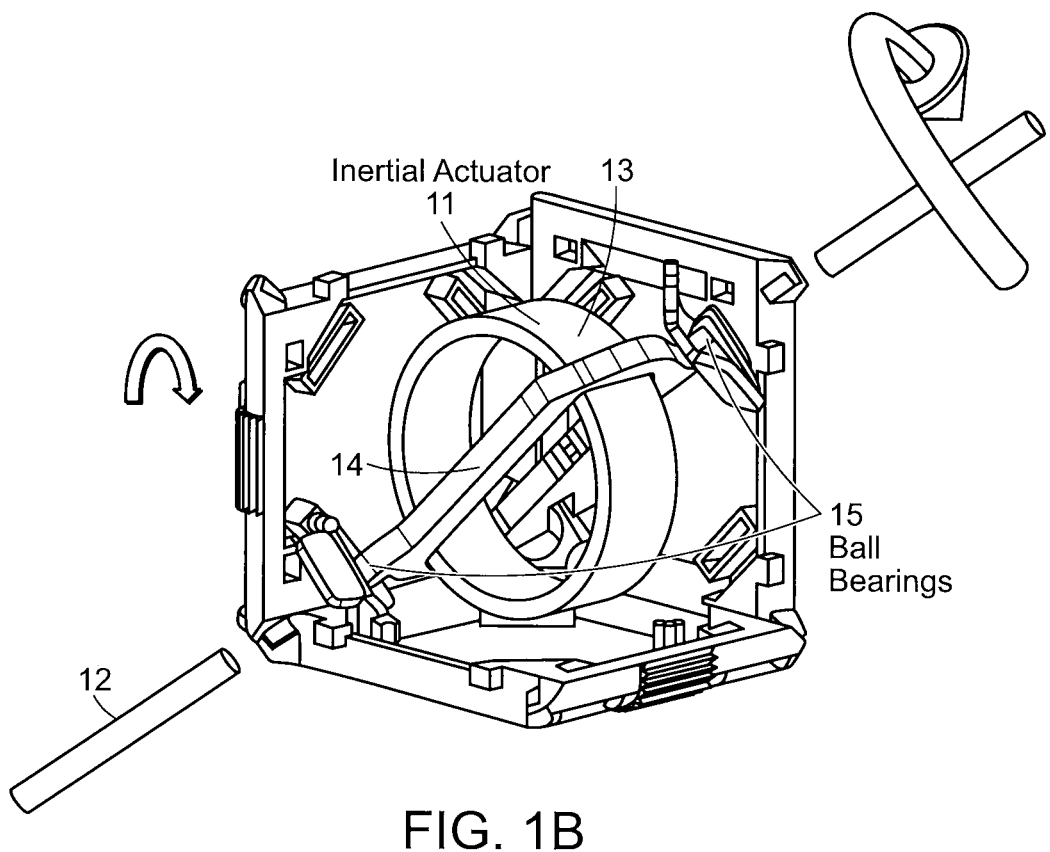
Figure 1C:
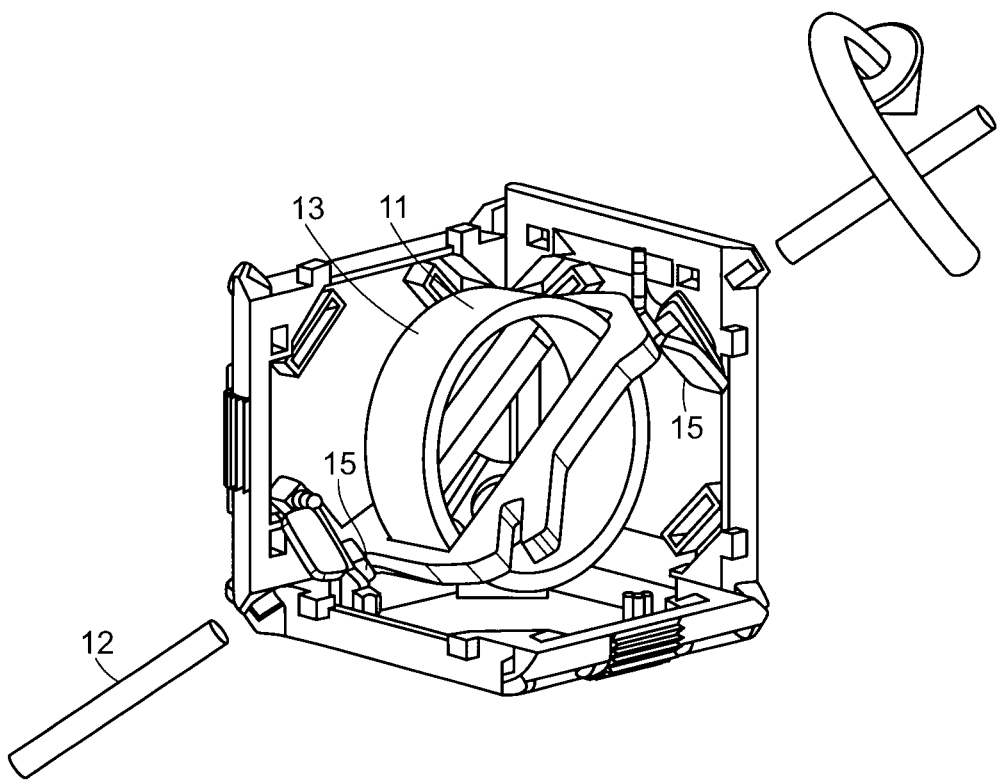

FIGS. 1B-1C show one of several possible ways to extend the actuation system beyond one plane while using a single inertial actuator. One example, FIG. 1B allows for motion in all three planes with only a single rotating joint. These three planes are enabled by rotating the actuator unit 11 along an axis 12 that connects to two opposite corners of the robot frame by way of ball bearing 15. This axis 12 creates an angle of 35.26 degrees between the axis and the three adjacent faces. The rotating axis 14 of the flywheel 13 is angled roughly 55 degrees from the rotation axis 12 of the unit, so that the plane of the actuator 11 matches up with the faces of the cube, and therefore the X Y and Z planes.

Some mechanism such as a motor, or potentially the random shaking motion of the inertial actuator, causes the inertial actuator 11 to rotate about the axis 12 and switch between the different planes, allowing for three dimensional motions. Also there is some type of latch mechanism which causes the actuator unit to rigidly connect to the frame when it is in one of the three planes parallel with the outer faces of the robot frame. FIG. 1C shows another orientation of the structure shown in FIG. 1B.

Figure 2:
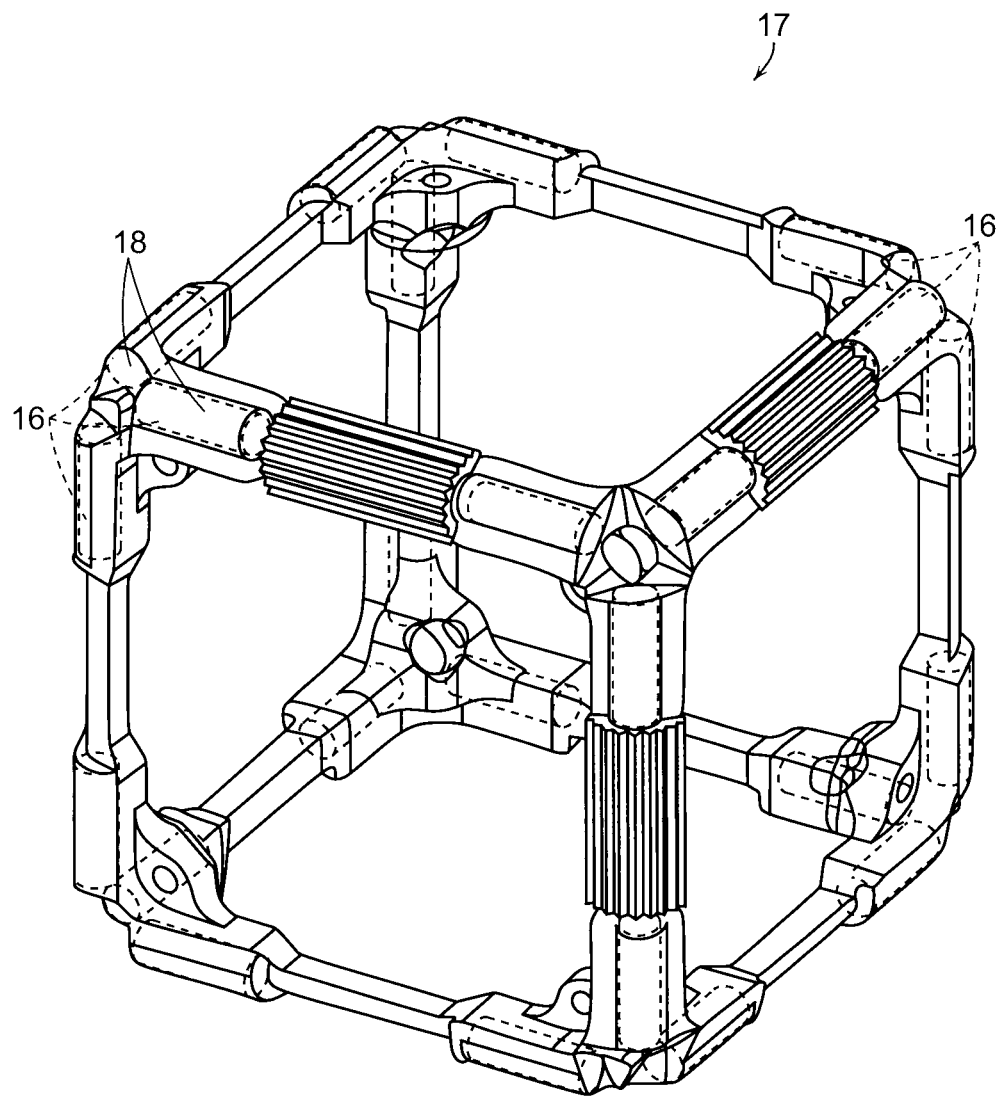
FIG. 2 is a schematic diagram illustrating the cubic frame used by the M-Block system.

An important aspect of the M-Block system is the novel design that allows the modules to quickly form magnetic, non-gendered, hinges on any of the cubes' twelve edges. These hinges must provide enough force to maintain a pivot axis through various motions. The invention solves this challenge by using twenty-four diametrically polarized cylindrical magnets 16, two of which are situated coaxially with each edge 18 of the frame 17, as shown in FIG. 2. The diametrically magnetized cylinder magnets 16 are free to rotate. This rotation allows configurations with two, three, or four modules to form high strength magnetic bonds while allowing the hinges to be ungendered.

Figure 3:
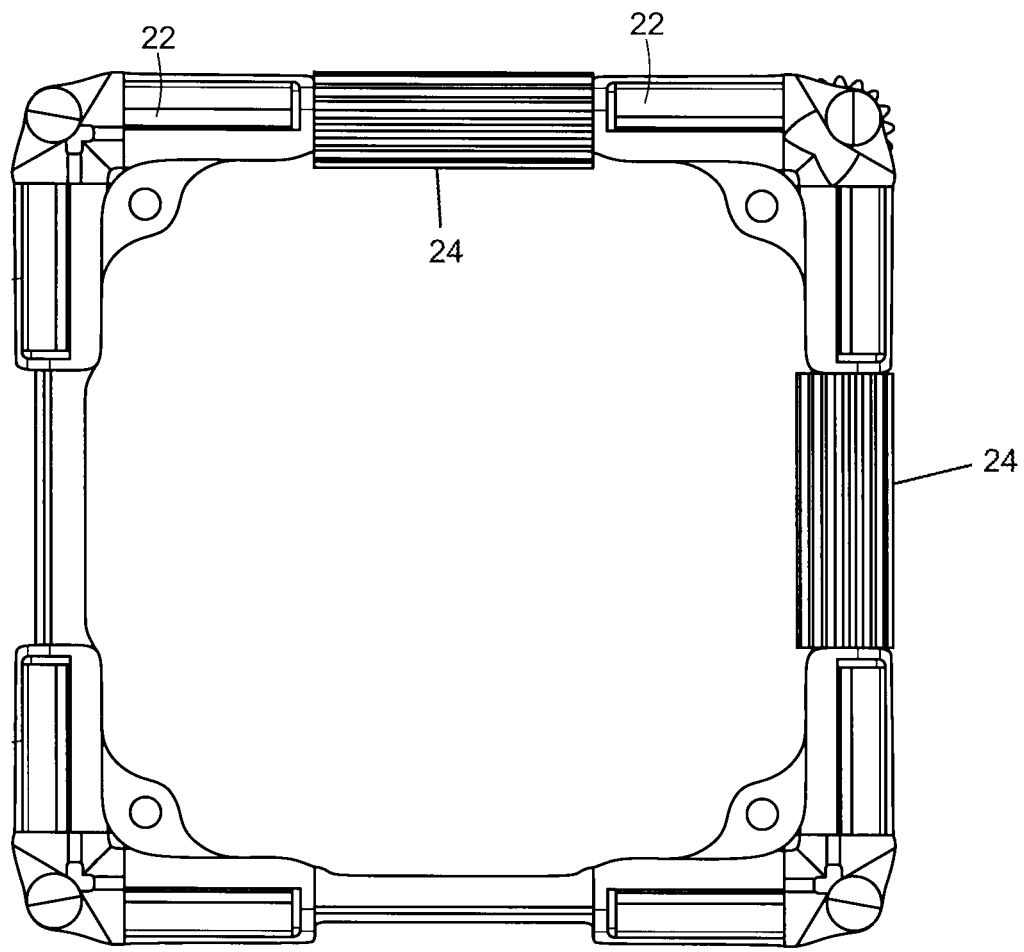
FIG. 3 is a schematic diagram illustrating the magnetic bonding used in accordance with the invention.

Magnets 22 are set back from the corners of each cube by a selective distance, in this case 1 mm, as shown in FIG. 3. This set-back is critical to the M-Block system performance because it guarantees that the strength of a hinge bond between two modules (involving four total magnets) is not dwarfed by the strength of the face bond between two modules (involving sixteen total magnets) when the modules are flush and well aligned. In contrast, if the face bonds were much stronger than the hinge bonds, the energy provided by the inertial actuators to break the face-to-face bond would overpower the hinge bond and result in the active module careening away from the assembly.

While the edge magnets 22 form strong hinges and serve to connect neighboring modules in the lattice, they are not sufficient to overcome misalignments that are introduced when modules pivot. To solve the alignment problem, eight diameter disc magnets 24 of a selective size, in this case 2.5 mm, are embedded in each of the six faces. These disc magnets are arranged in an eight-way symmetric pattern in order to maintain the modules' gender neutrality. These alignment magnets 24 are strong enough to pull a module into alignment as it finishes a rotation, but they do not add significant holding force to the face bonds. In this case, the flywheel itself is a 20 g stainless steel ring with a moment of inertia of $5:5 \times 10-6$ kg m2, but other flywheel structures can be used as well. It is rigidly fixed to an out-runner style brushless DC motor. In this case, the brushless DC motor can be capable of spinning at up to 20000 rpm or more.

Figure 4A:
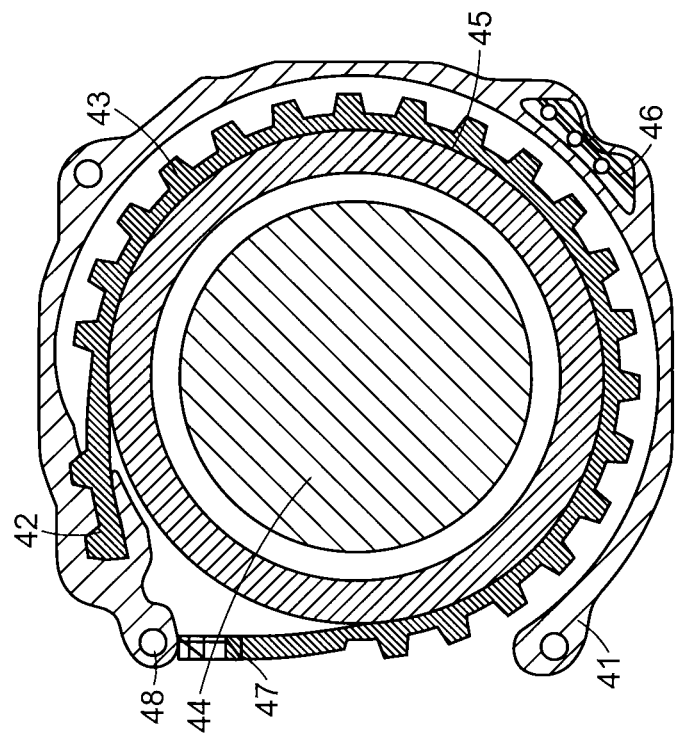
FIGS. 4A-4B are schematic diagrams illustrating the details of the actuator system used in accordance with the invention.
Figure 4B:
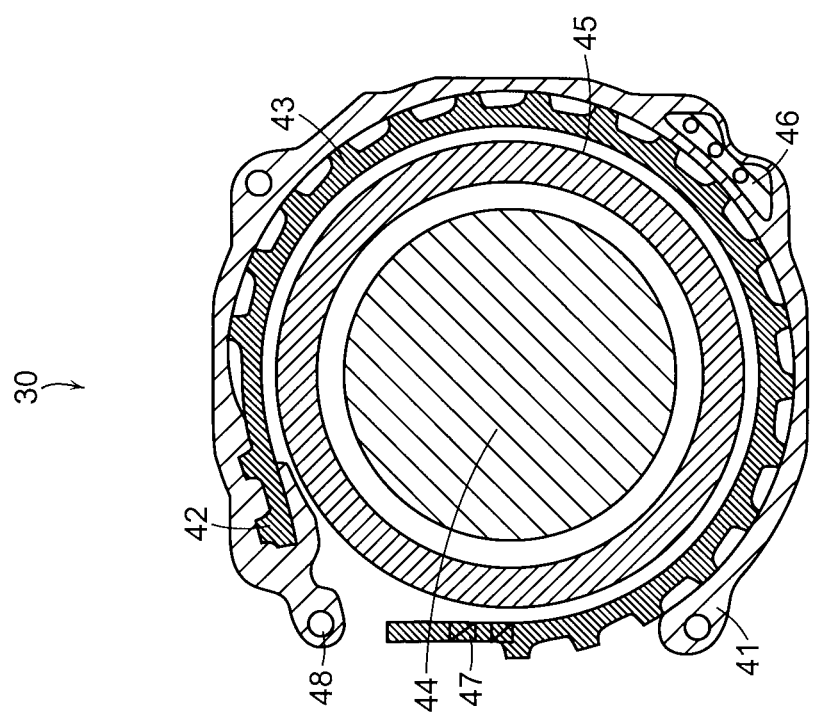

A flywheel 45, as shown in FIG. 4A is quickly decelerated with a self-tightening rubber belt 43 that is wrapped around the flywheel's 45 circumference. When un-actuated, the belt 43 is loose and constrained by a cage to maintain a spacing, in this case 1 mm, from the flywheel 45. To tighten the belt 43 and stop the flywheel 45, a servo motor 44 is used which pulls the belt 43 in the direction of rotation, as shown in FIG. 4B. As the belt 43 contacts the flywheel 45, the flywheel's motion further tightens the belt 43 resulting in a rapid deceleration. The Inertial Actuator frame 41 is rigid structure which connects various components of the inertial actuator 30 and also maintains a consistent separation between the belt 43 and the flywheel 45. The belt attachment point 42 is a rigid attachment between the actuator frame 41 and the brake belt 43, and the electrical connection 46 are wires which actuate the motor 44 are brought to the central controller unit. The belt actuator attachment point 47 is a joint where the belt actuator output 48 attaches to the belt 43.

Each module is controlled by a custom-designed PCB, in this case a 32-bit ARM microprocessor and an 802.11.4 XBee radio from Digi International. Three 125 mAh LiPo batteries connected in series can power the modules, but other types of batteries can be used as well. The processor responds to commands received wirelessly the user's computer in order to control the inertial actuator. The low-level BLDC control can be performed by a commercial motor driver or the like. Additionally, each PCB can include a 6-axis IMU (to determine absolute orientation); an outward-facing IR LED/photodiode pair (for neighbor-to-neighbor communication); and several Hall Effect sensors to detect misalignment between modules.

The sliding cube model (SCM) is one of the more prevalent algorithmic frameworks that has been developed for modeling the motions of lattice based self-reconfiguring modular robots. To overcome the physical implementation issues of the sliding cube model and to utilize the favorable traits of the M-Block hardware, a novel physical pivoting cube model (PCM) was developed that is based on existing theoretical models. In the novel PCM, cubic modules locomote by pivoting about their edges, in effect rolling from one position to the next.

While the specifics of the approach differ from those of the SCM, pivoting still allows generalized reconfiguration. The invention allows for motion in both 2D and 3D permitting any set of specific algorithms to be used that generate motion.

Figure 5C:
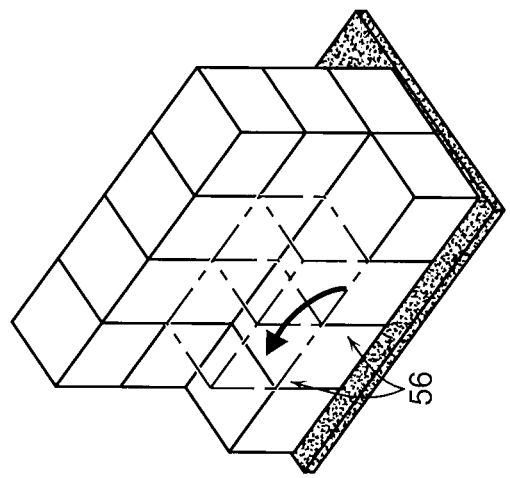
FIGS. 5A-5C are schematic diagrams illustrating the motions performed by an M-Block module.
Figure 5B:
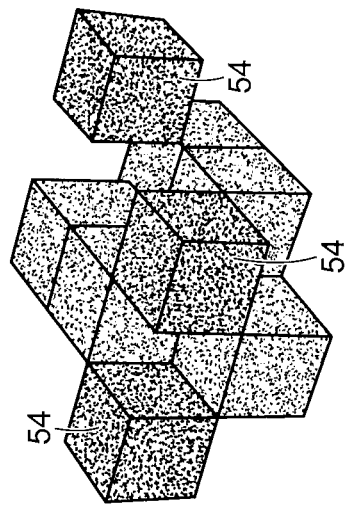
Figure 5A:
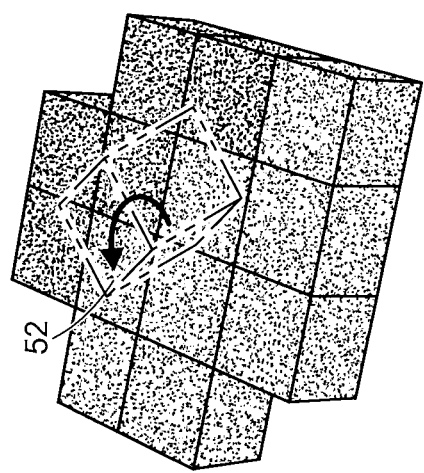

The inventive model includes several additional assumptions about the types of motions the modules can execute and implement. While already assumed by other models, the modules 52 involved in pivoting motions sweep out a volume that must not intersect other modules, as shown in FIG. 5A. Stable lattice configurations must have modules connected via their faces, not their edges 54, as shown in FIG. 5B. Modules 56 involved in pivoting motions must be able to slide past stationary modules in adjacent planes, as shown in FIG. 5C. This allows modules to move independently. Modules can locomote in unstructured environments without a supporting lattice, (e.g. on the ground). Multiple modules can move as a connected unit, but they must all share a single axis of rotation.

These assumptions allow individual modules or groups of modules to execute a range of motions including concave transitions, convex transitions, and translations (both on and off lattice). In particular, a disjoint set of modules can locomote over open ground to coalesce at a centralized point and then proceed to form an arbitrary structure. To complement the model's theoretical underpinnings, one can supplement it with realistic physical constraints. These include mass, inertia, gravity, friction, etc., but one assume that the modules are rigid bodies and that the pivot axes do not slip.

Figure 6:
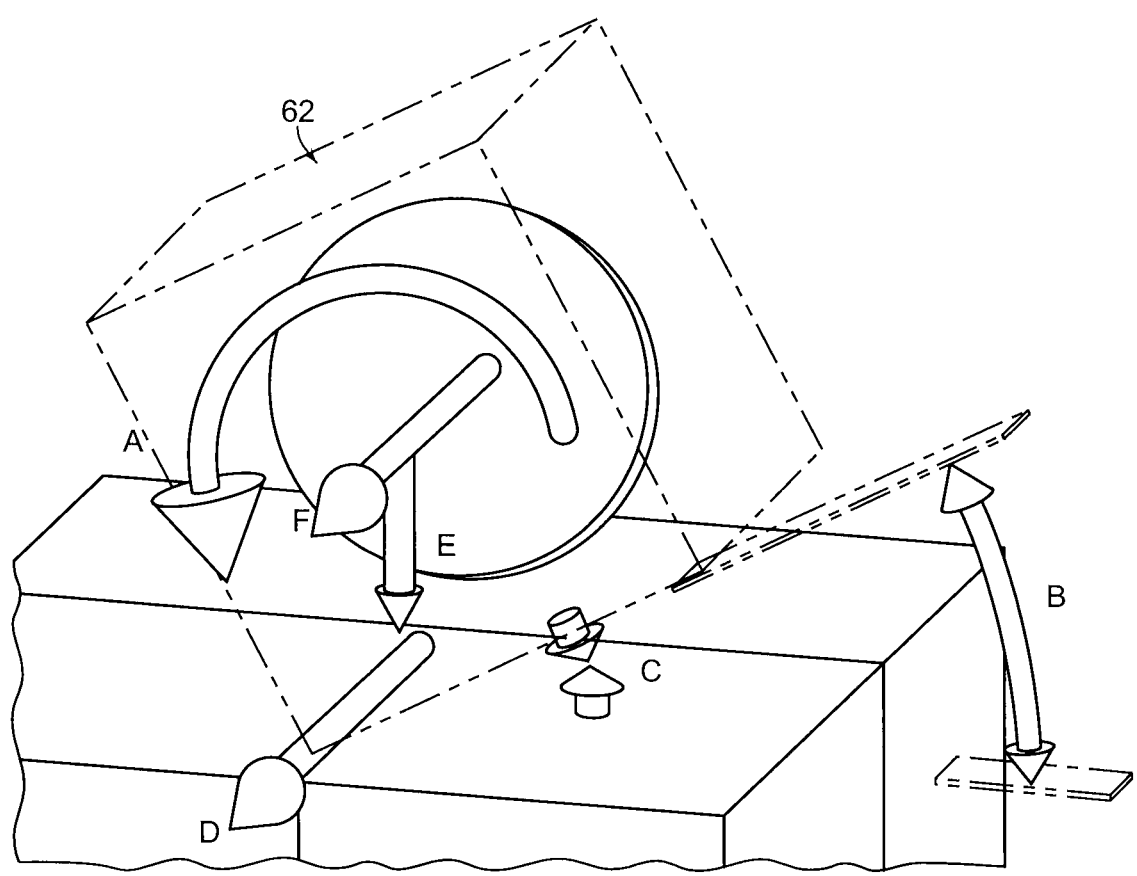
FIG. 6 is a schematic diagram illustrating the details of calculating the physical interactions of an M-Block module.
Figure 7A:
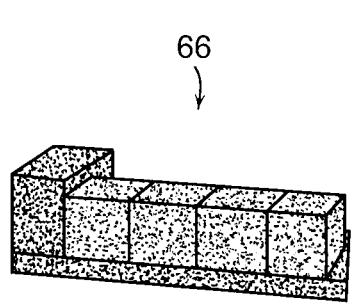
FIGS. 7A-7E are schematic diagrams illustrating selective lattice configurations formed in accordance with the invention.
Figure 7B:
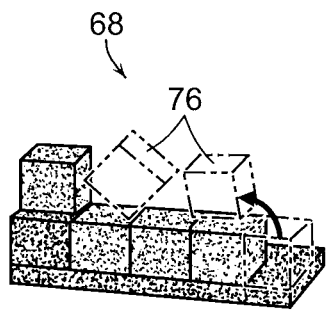
Figure 7C:
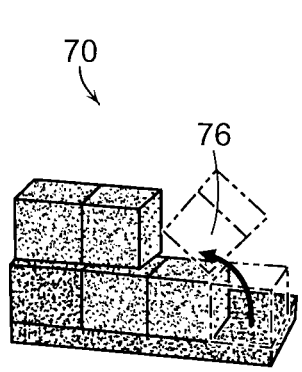
Figure 7D:
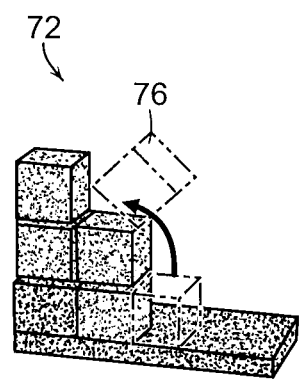
Figure 7E:
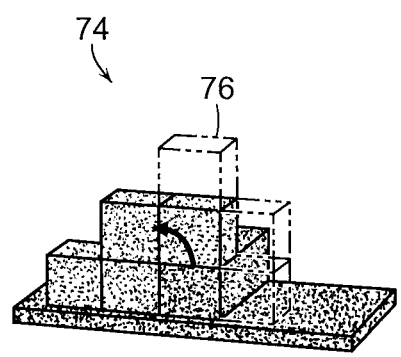

FIG. 6 shows when a torque (A) about an axis (F) causes the module 62 to pivot through an angle (B) about an axis (D), the module 62 experiences additional forces: downward force due to gravity (E) and magnetic force from the face-to-face bonds (C).

In the most basic instantiation, a pure moment ($T_{pm}^{(k)}$) is applied to the k-th module by its inertial actuator. This moment causes the module to want to rotate about its center of gravity, but instead, the module is forced to rotate about a pivot axis that is created by the magnetic hinge, as shown in FIG. 6. Using the parallel axis theorem, one can calculate the moment of inertia about this pivot axis. This approach can be generalized to find the moment of inertia (IA) for any set (A) of connected modules about an arbitrary axis. Because the actuators generate pure moments, all of their applied torques can be superimposed and applied en masse about the assembly's pivot axis.

Other forces, including gravity ($m_A$ g), magnetic attraction ($F_m^{(k)}$)), and friction act to prevent this pivoting, as shown in FIG. 6. If the single module 62 in FIG. 6 is viewed as a generalized set of modules moving as a rigid unit, one can construct a torque balance equation for the assembly:

$$\frac{d^2\theta}{dt^2} = \frac{-m_A \cdot g \cdot \cos(\theta) \cdot r_{cg} + \sum_{k \in A} T_{pm}^{(k)}(t) - F_m^{(k)}(\theta) \cdot r^{(k)}}{I_A} \quad \text{Eq. 1}$$

While not explicitly stated in the equation, $\theta(t)$ is a function of time. $r_{cg}$ is the distance between the pivot axis and the assembly's center of gravity, and r(k) is the distance between the pivot and the center of the face of the k-th module in the assembly. This differential equation is non-linear and time-varying. It ignores sliding friction which would be subtracted from the numerator of the right-hand side (thereby resisting the torque of the actuators) and which will be highly dependent on the configuration of modules in adjacent planes. Solving this equation for $\theta(t)$ would give one an approximate description of the motion of a set of modules. However, it was not analytically solved. One can use it as a basis for a rough analysis and comparison of the different physical parameters and torques acting on the system.

The basic message of the equation is that one should aim to maximize pure moments ($T_{pm}^{(k)}$) while minimizing the mass (mA) and inertia (IA). While decreasing the magnetic bonding strengths ($F_m^{(k)}$)) would lead to more energetic motions, those same magnetic forces are used to maintain the magnetic hinges and the system's structural integrity. Finally, it is worth emphasizing that the pure moments from all of the inertial actuators sum equally over all the modules in a rigid assembly. This is a fundamental property of inertial forces and allows multiple modules to move as a group.

In order for modular robots to realize self-assembly and robust operation, the unit modules need to be both self-contained and independently mobile. Although researchers have produced modular systems in which the modules can locomote independently, most of these systems are limited to controlled environments. In contrast, the M-Blocks are independently mobile, and they show an ability to move through difficult environments. Although they only have a single actuator, they can exhibit several motions including rolling, spinning in place, and jumping over obstacles up to twice their height.

This diverse set of motion primitives enables novel motion algorithms. This allows for 2D or 3D versions of the hardware to have an easier time moving around in a controlled environment. One method that one can use to drive an M-Block towards a specific goal is to implement a bimodal behavior. When the module's actuator is aligned with the goal location, the actuator is used to apply a moderate amount of torque that causes controlled rotation toward the goal. When the module is not aligned with the goal, one can stochastically reorient the module using a high torque that causes unpredictable movement. A group of disjoint M-Blocks executing this behavior can self-assemble into a lattice structure.

Once a group of M-Blocks has aggregated into a lattice structure, the modules are able to reconfigure using a variety of motion primitives. FIGS. 7A-7E show examples of lattice reconfigurations 66, 68, 70, 72, 74 used in accordance with the invention. In general, the modules can execute translations, convex transitions, and concave transitions. When translating, the modules 76 rotate through 90 degrees to move to an adjacent position within the same plane. Translations can be vertical (ascending or descending) or horizontal (supported from any side, including above). For examples of translations refer to the table shown in FIG. 8.

Convex and concave transitions allow the modules to move between orthogonal planes. Convex transitions are used to traverse outside corners by rotating through 180 degrees. The modules can perform convex transitions in either horizontal or vertical planes (columns 4-5 of FIG. 8). Concave transitions are 90 degree rotations that are used to traverse inside corners. As before, these moves can be horizontal or vertical (columns 6-7 of FIG. 8). Due to the fact that the active module is bonded to neighbors in two orthogonal planes when the move begins.

When operating on a lattice, groups of modules 82 that share the same pivot axis are able to coordinate their actuators in order to move together. Not only does this increase the stability of the motion due to longer pivots as in FIG. 9A, but it also decreases planning complexity when attempting to relocate groups of modules 82 on a lattice.

Figure 9B:
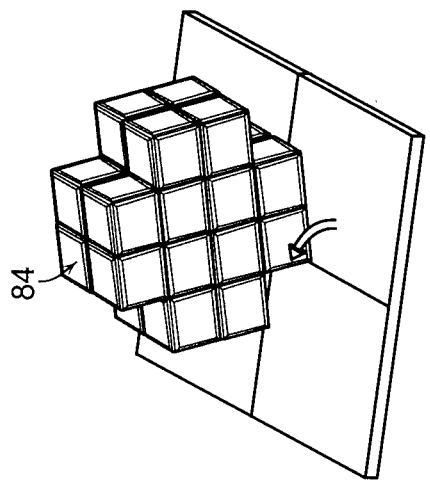
FIGS. 9A-9C are schematic diagrams illustrating groups of M-Block modules moving as rigid assemblies.
Figure 9C:
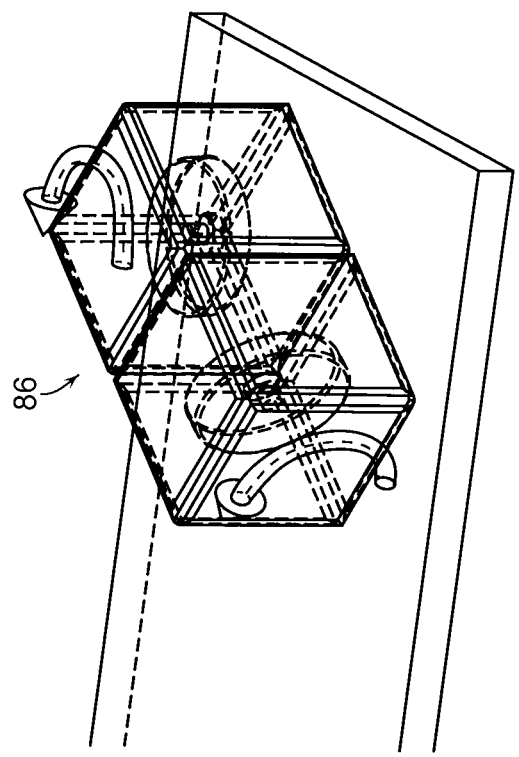
Figure 9A:
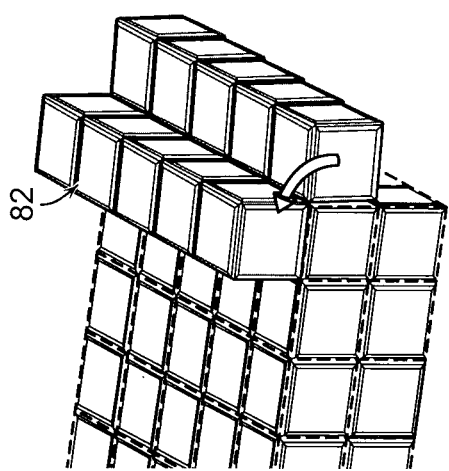

Assemblies of modules 84 are able to move together in the environment by first reconfiguring in order to approximate a wheel or sphere, as shown in FIG. 9B and then simultaneously applying their inertial actuators. An additional type of group movement involves small groups forming meta-modules, as shown in FIG. 9C, to more precisely control their trajectories. The modules 86 can be oriented such that their actuators are aligned in orthogonal planes allowing control over additional degrees of freedom. When a disjoint group of modules is self-assembling, these meta-modules can serve as intermediate assemblies to increase the speed of the aggregation.

Figure 10:
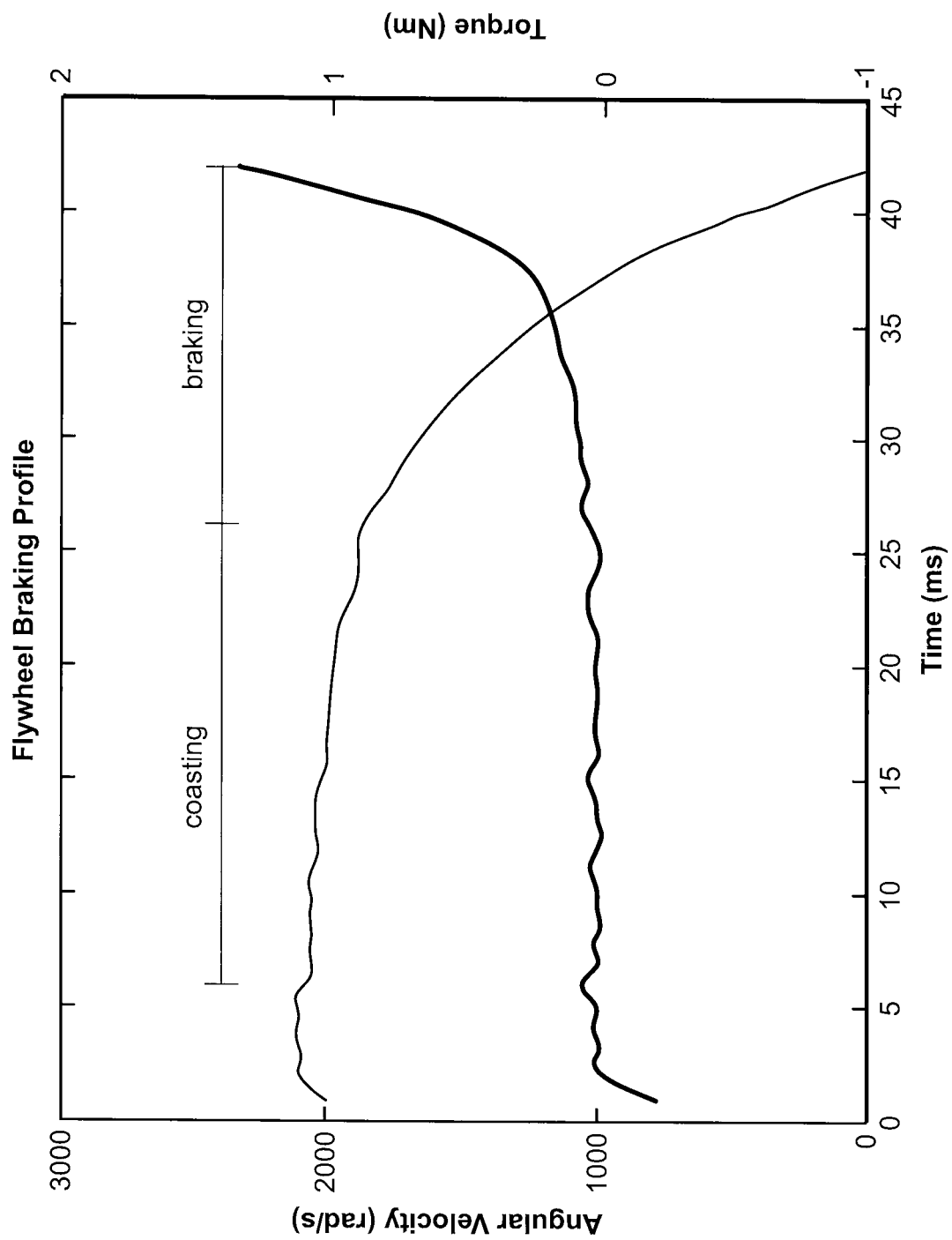
FIG. 10 is a graph illustrating the angular velocity profile of the inertial actuator's flywheel as measured by an optical encoder.

The modules were tested as they executed a range of different lattice reconfiguration moves; a representative sample of these moves are shown in FIG. 10.

Each M-Block inertial actuator needs to provide a high, almost instantaneous, application of torque in order to break the strong permanent magnet bonds holding it into the lattice structure. As previously described, the actuator is able to decelerate the flywheel from 2100 to 0 rad=s in about 10 ms. By differentiating the measured angular velocity profile of the flywheel during deceleration, the torque is shown in FIG. 10. The entire actuation event, from the moment the brake signal is sent, to moment when the flywheel reaches zero angular velocity, is roughly 50 ms. The torque peaks at over 1 nm. As shown in FIG. 10, most of the torque is applied over a 10 ms span, which transfers approximately 1000 watts (average) to the cube frame. More rigorous attempts to model the actuation event will hopefully be the focus of future work involving high-speed video cameras and a modeling of the elasticity of the constituent elements. In experiments with several different modules, one can notice that the maximum applied torque varies with the particular actuator due to belt wear and fly-wheel material.

Figure 11A:
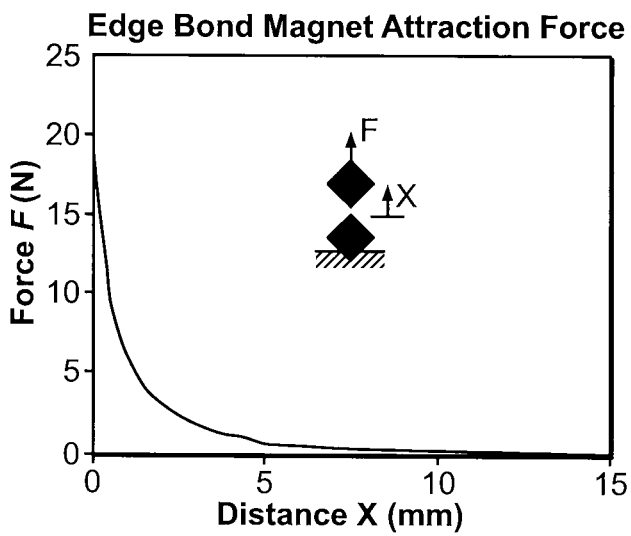
FIG. 11A-11C are graphs illustrating the pull strength of various conditions of the magnetic hinges as measured with a custom-built testing fixture.
Figure 11B:
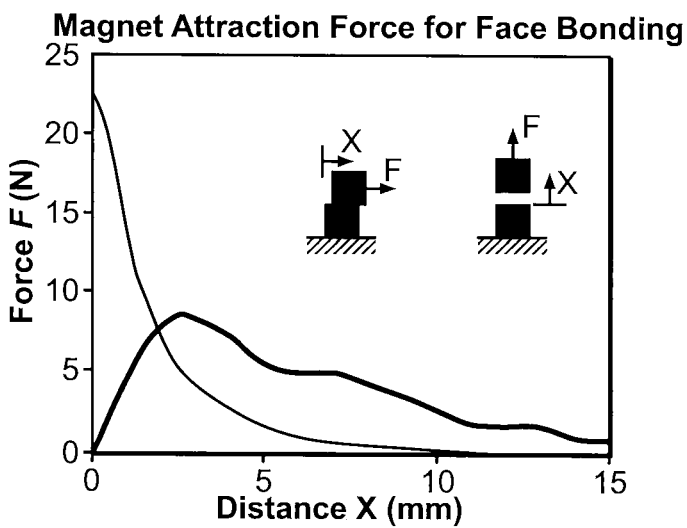
Figure 11C:
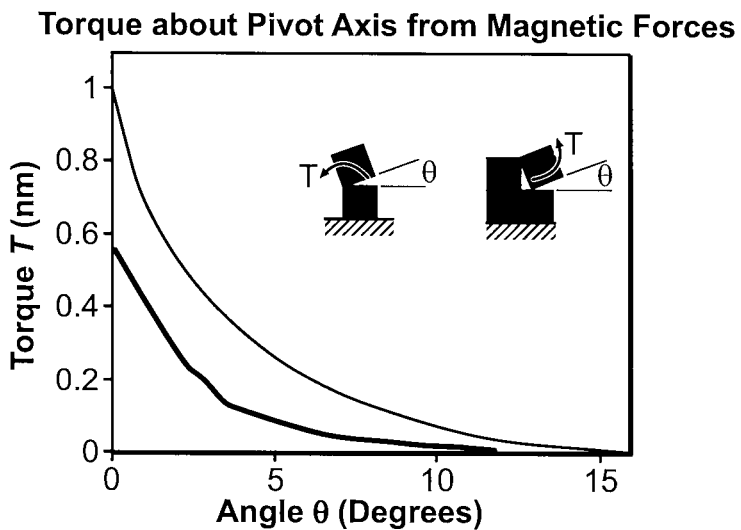

Moreover, the magnet bonding system needs to provide enough force for robust face-to-face connections as well as strong edge-to-edge bonds. To provide this high strength in a small volume, one can use N-52 grade rare-earth neodymium magnets. The pull strength of various conditions, are shown in FIGS. 11A-11C. The force of the hinge strength drops very quickly after holding a maximum force of around 18N, as shown in FIG. 11A. The force between the faces in tension (red), and in shear (blue) are important for bonding, as shown in FIG. 11B. One can measure the torque required to rotate a module as a function of an angle from 0 to 16 degrees, as shown in FIG. 11C. In particular, the pull strength of about 23N is enough to support a chain of 16 modules hanging vertically. Additionally, the torque required to separate two modules (in two different configurations) is shown in FIG. 11C. The high torque exhibited for the module bonded with two neighboring faces is near the limit of what the inertial actuator can overcome.

One goal of the M-Blocks is to provide robust lattice reconfiguration. FIG. 8 demonstrates the results of a range of different attempted motions. The range of flywheel RPM's before braking was found through trial and error. A motion is considered a success if after three attempts it can successfully move to its desired lattice position without exhausting its battery or disconnecting from the regular lattice structure. There are many factors which are important to movements that seem to vary randomly. One can think that the exact force in each bond, as well as the precise torque profile from the actuator, vary both on a module-by-module basis and with the exact system configuration.

The invention describes the development of the M-Blocks, 50 mm cubic robots that use inertial forces to move independently in a range of environments; perform lattice-reconfigurations on a substrate of identical modules; and move ensembles of modules in both lattice reconfigurations and in external environments. The M-Blocks are unique; in particular, their mechanical simplicity sets them apart from existing systems. This simplicity leads to robustness not seen in other modular robotic systems. The M-Blocks are designed to be sturdy structures. These attributes are essential if any modular robotic system is expected to scale into the hundreds or thousands.

Although the present invention has been shown and described with respect to several preferred embodiments thereof, various changes, omissions and additions to the form and detail thereof, may be made therein, without departing from the spirit and scope of the invention.

What is claimed is:

1. A modular robot comprising:
a frame structure that includes a plurality of cylindrical bonding magnets that are coaxially positioned with each edge of the frame structure and coupled to another of the plurality of cylindrical bonding magnets forming magnetically coupled, non-gendered, hinges on any edge of the frame, the hinges connect a plurality of frame modules that define a plurality of frame structures, the hinges form magnetic bonds between the cylindrical bonding magnets to provide strength to support a pivot axis through one of the edges, the cylindrical bonding magnets are free to rotate permitting the frame modules to maintain the magnetic bonds while allowing the hinges to be ungendered; and
a movement generator positioned within the frame structure that applies an inertial torque about the pivot axis to generate movement allowing independent locomotion, wherein the movement includes a plurality of convex and concave transitions to move between orthogonal planes by transferring angular momentum accumulated in the movement generator, wherein when the movement generator is aligned with a location and applies a torque that causes controlled rotation towards the location, when the movement generator is not aligned with the location the movement generator stochastically reorients the frame structure using a torque that causes unpredictable movement so as to align the movement generator with the location and assembling the plurality of frame structures into a lattice structure.

2. The modular robot of claim 1, wherein the cylindrical bonding magnets are diametrically polarized.

3. The modular robot of claim 1, wherein the movement comprises moving independently in traverse planar unstructured environments.

4. The modular robot of claim 1, wherein the movement approximates sliding motion.

5. The modular robot of claim 1, further comprising a plurality of alignment magnets arranged to maintain gender neutrality.

6. The modular robot of claim 5, wherein the alignment magnets comprise diameter disc magnets being embedded in each face of the frame structure.

7. The modular robot of claim 1, wherein the movement comprises two dimensional or three dimensional movements.

* * * * *